ANALOG PEN TRACKING ON A CATHODE RAY TUBE DISPLAY DEVICE

Filed Feb. 14, 1967 3 Sheets-Sheet 1

INVENTORS
JOHN E. WARD
WILLIAM D. STRATTON

BY: Martin M. Santa
ATTORNEY

INVENTORS
JOHN E. WARD
WILLIAM D. STRATTON

BY: [signature]

ATTORNEY

ANALOG PEN TRACKING ON A CATHODE RAY TUBE DISPLAY DEVICE

Filed Feb. 14, 1967 3 Sheets-Sheet 3

INVENTORS
JOHN E. WARD
WILLIAM D. STRATTON

BY: [signature]
ATTORNEY

United States Patent Office 3,505,561
Patented Apr. 7, 1970

3,505,561

ANALOG PEN TRACKING ON A CATHODE RAY TUBE DISPLAY DEVICE

John E. Ward, Lexington, and William D. Stratton, South Acton, Mass., assignors to Massachusetts Institute of Technology, Cambridge, Mass., a corporation of Massachusetts Filed Feb. 14, 1967, Ser. No. 616,093
Int. Cl. H01j 29/78
U.S. Cl. 315—18 7 Claims

ABSTRACT OF THE DISCLOSURE

Pen tracking apparatus for use with a computer-driven cathode-ray tube display is described. A pattern of beam spots on the cathode-ray tube centered about the previously determined center of the pen is within the field of view of the pen. The amplitude of the pen response to each of these spots is compared to determine in what direction the center of the spots must be moved in order to coincide with the pen center.

The invention herein described was made in the course of a contract sponsored by the U.S. Navy, Office of Naval Research.

BACKGROUND OF THE INVENTION

Many modern digital computer systems contain display equipment capable of facilitating the insertion of graphical material into memory. One such technique employs "pen tracking," a term used to denote the ability to control the electron beam of a cathode ray tube with an external "writing" device. Graphical information can be inserted using a light pen as the writing device. The use of a light-sensitive pen in this manner is an established technique for guiding the motion of a CRT beam. Through the tracking process, the pen controls the position of the electron beam by sensing the light output of the phosphor excited by this beam. To furnish a sketch to the computer, the display console is placed in the tracking mode and the operator "draws" on the face of the CRT with the light pen. The coordinates of the path described by the pen are retained by the computer to permit continuous display of the material being sketched.

In a particular prior art display equipment, pen tracking is accomplished digitally by logic within the display console itself. A light pen controls the position of the electron beam, and beam horizontal and vertical coordinates are stored in registers within the console. These registers are regularly sampled by the computer. Hardware implementation of the tracking operation in the display console frees the computer from performing this necessarily repetitive chore of tracking. In this prior art system, when in the tracking mode of operation, the scope display is interrupted every 10 milliseconds and a tracking cycle of approximately 1 millisecond duration is used to update pen position (a 10-millisecond interval between tracking cycles is about an upper limit if the beam is not to be lost when the pen is moved rapidly across the scope face). The tracking cycle consists of the generation and display of a tracking pattern centered at the last known position of the light pen as determined during the previous tracking cycle. Recalculation of present pen position is accomplished using the response of the light pen to this pattern. The tracking pattern is a small cross consisting of 32 points of light drawn on the CRT by the display console line generator. The points are plotted one at a time, starting at the center of the pattern, and incrementing out to describe the arms of the cross.

The light pen consists of a photoconductive sensor and associated electronics (one type of pen consists of a photo-multiplier tube and threshold detector, with a fiber-optic cord linking the pen and photomultiplier). When positioned over the tracking pattern described above, the pen yields an output pulse for each illuminated point of the cross which falls within its field-of-view. The console logic counts the points seen on each of the four arms of the cross and recalculates present pen position from this digital information. This position serves as the center of the new tracking cross to be generated in the next tracking cycle. The cycle takes approximately 1 millisecond to complete, hence, occupies about 10 percent of the total display time.

The time required for completion of a tracking cycle is limited by the phosphor response of the scope. Cathode ray tubes used in computer display are rewritten 30 times per second, or less, and must have a persistent phosphor in order to reduce flicker to tolerable level. Due to this light persistence, it has been found necessary that a blanking interval of about 14 microseconds exist between successive illuminated points of the cross if the pen is to make a reliable "seen"/"not seen" decision. With 64 points being illuminated in one cycle (i.e., each of the 32 points of the cross is illuminated twice: once on the outward trace of the arm, and again when returning to the center), the resulting total pattern generation time is about 1 millisecond. This represents a considerable portion of the total time available for display. As each additional console is added to the same tracking system, operating on a time-shared basis, an additional 10 percent of display time is required, and the amonut of potential display time being absorbed by the tracking operation becomes of considerable concern. The problem, then, can be very succinctly stated: the time required by the present digital technique for light pen tracking is excessive. A faster method is needed for updating the position of a pen moving over the face of a display console.

SUMMARY OF THE INVENTION

This invention is an "analog" pen-tracking technique which requires a considerable smaller tracking cycle time than the digital system described earlier. Digital tracking operates on a points-seen-or-not-seen basis, and a large number of tracking pattern points are necessary to achieve positional accuracy. The analog method differs from this in that the amplitudes of the pen responses to a small number of displayed points convey the required positional information. Rather than counting the total number of points whose responses exceed a preset threshold level, the amplitudes of the pen responses from only four points of light on the CRT are compared to provide updating of pen position.

Basic operation may be explained as follows. Initially, assume that the pen 55 is placed against the CRT 56 face and held in a fixed position while a point of light (the electron beam 57) sweeps past. If the output signal of the pen is plotted as a function of beam position, a curve such as that shown in FIG. 1 is obtained, the exact shape depending on the pen optics. If instead, the electron beam is deflected incrementally so as to generate two points of light in the vicinity of the pen as in FIG. 2, with point 1 displayed first, followed by point 2, two corresponding pen output voltages E1 and E2, result. The difference between these D-C amplitudes, E1–E2, provides a measure of the distance separating the pen center from the midpoint of the line joining the two displayed points. Only when the quantity E1–E2 is zero will the two points be symmetrically centered about the pen.

An analog tracking pattern can consist of four points as in FIG. 3. Point 1 is illuminated first, followed by points 2, 3, and 4. With a pen placed over this pattern, the horizontal pair of points 1, 2 provides a horizontal error voltage, $\Delta Eh$, and the vertical pair, $\Delta Ev$. Converting these orthogonal difference voltages to error distance (specifically, increments of distance along the horizontal and vertical axes of the CRT face), and adding them to the coordinates of the pattern center, establishes the position of the pen. This is accomplished by converting the error voltages to digital code (with appropriate scaling) and adding them to the digital coordinates of the pattern center, moving the cross center to this new position centers it about the axis of the pen. Repeating this "tracking cycle" at periodic intervals would permit the cross, hence the CRT beam, to follow a pen moving over the scope face. The time interval between tracking operations is utilized to display the graphical material being described by the pen.

DESCRIPTION OF THE PREFERRED EMBODIMENT

Figure 1:
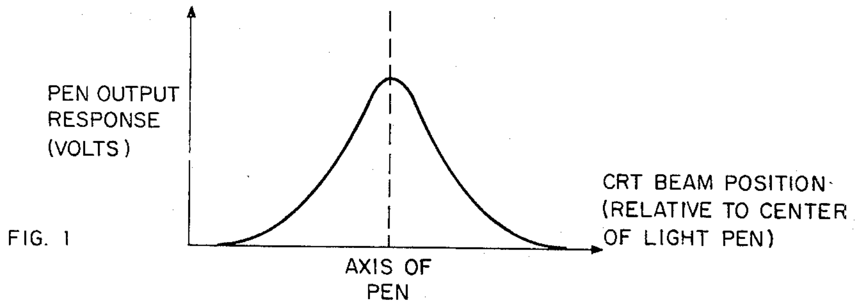
FIG. 1 is a typical pen amplitude response curve.
Figure 2:
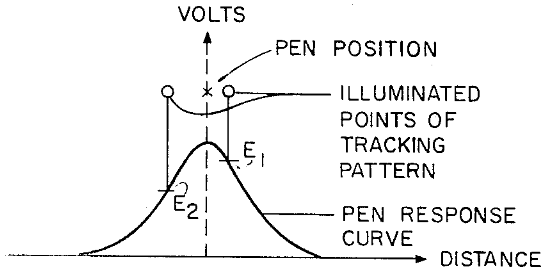
FIG. 2 shows the analog voltage developed in the pen from only two illuminated points.
Figure 3:
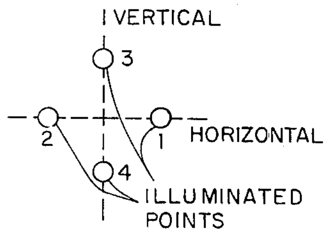
FIG. 3 shows the analog tracking pattern of the illuminated points on the face of a cathode ray tube.
Figure 4:
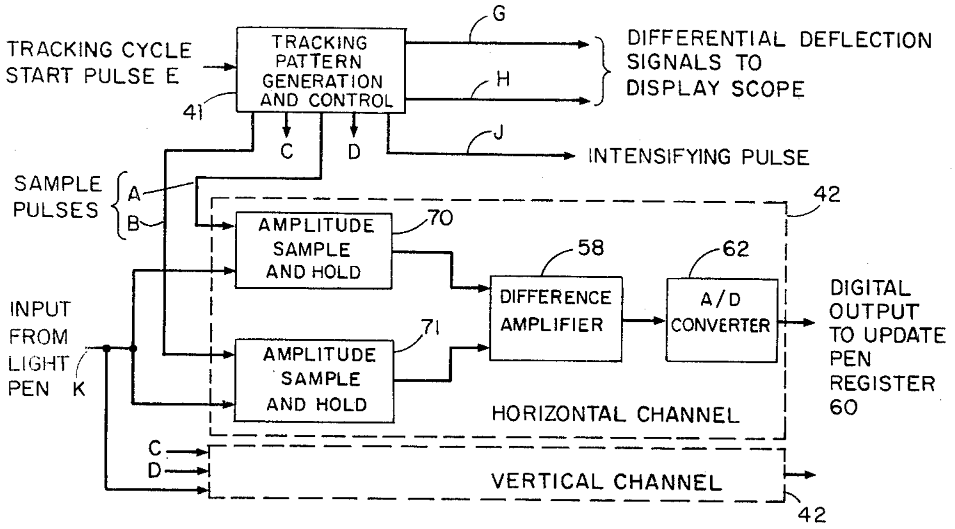
FIG. 4 is a functional block diagram of the analog pen tracking system.

As shown in FIG. 4, the pen tracking circuits consist of two basic parts: the tracking pattern generator 41, and the pen-signal processor 42. The tracking pattern generator 41 provides synchronized horizontal G and vertical H deflection signals and intensification signals J to plot the four-point tracking pattern. It also provides timing pulses A–D to the pen-signal processing circuits 42.

The horizontal (right-left) deflections occur first, and the right $E_1$ and left $E_2$ pen-amplitude samples are stored in sample-and-hold circuits 70, 71 as waveforms N, O. After a delay (to allow for transients to subside), the difference amplifier 58 yields the horizontal error voltage R, which is converted to digital binary code T and loaded into the $\Delta X$ register 59 of the display system in preparation for updating the horizontal pen position register 60.

FIGURE 4 indicates that the tracking system has an identical vertical channel which receives its inputs C, D slightly later than the horizontal channel (i.e., when the vertical deflections occur). Alternatively, one channel can be used for both horizontal and vertical error measurements if the vertical deflections are delayed until the horizontal coding operations are completed. This would take longer, but save on equipment. The remainder of this discussion assumes a parallel system.

Note that since the signal at the input to the analog-to-digital converter 62 is an error signal denoting how far the pen moves between tracking cycles, only a few binary digits (bits) are needed in the analog to digital (A/D) converter 62, irrespective of the total resolution of the display surface. The number of bits and their weighting depend on the pen field-of-view, the tracking cycle repetition rate, and the desired maximum pen speed which the system is to follow. They may be varied in accordance with the parameters of a particular display and a particular light pen.

Figure 5:
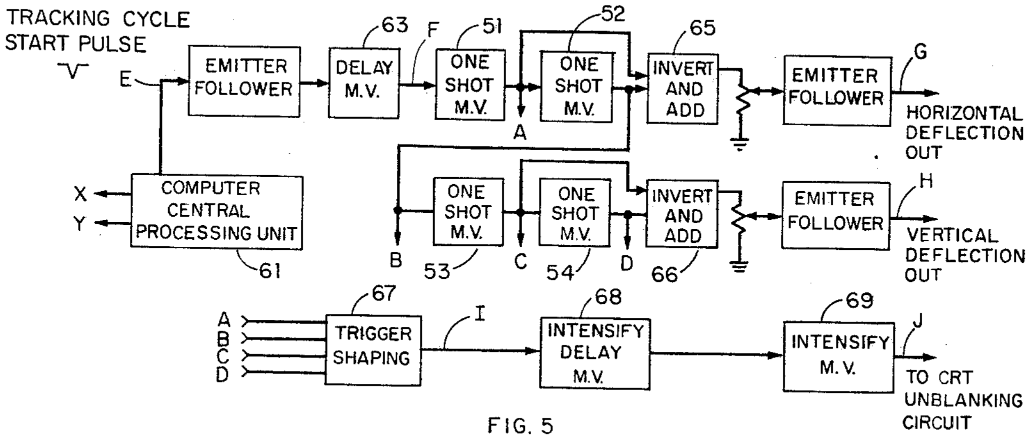
FIG. 5 is a block diagram of the circuitry which generates the four-point pattern for analog tracking.
Figure 6:
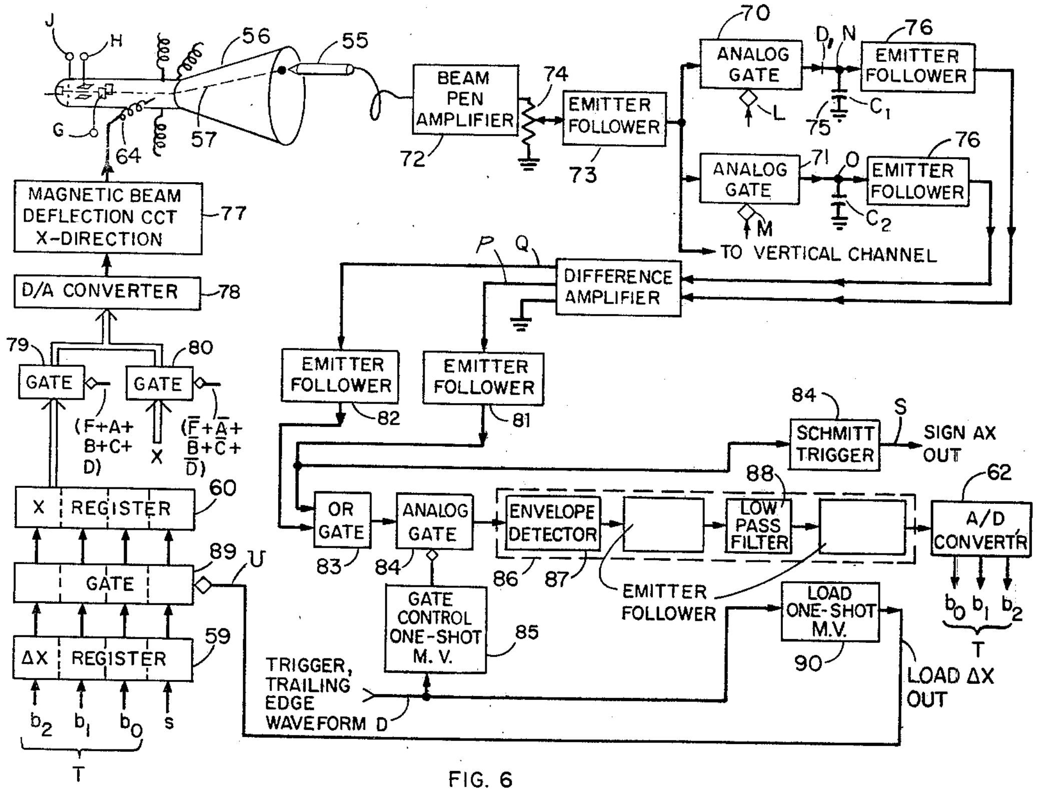
FIG. 6 is a block diagram of the circuitry for processing the analog difference voltage in one channel, the horizontal.
Figure 7:
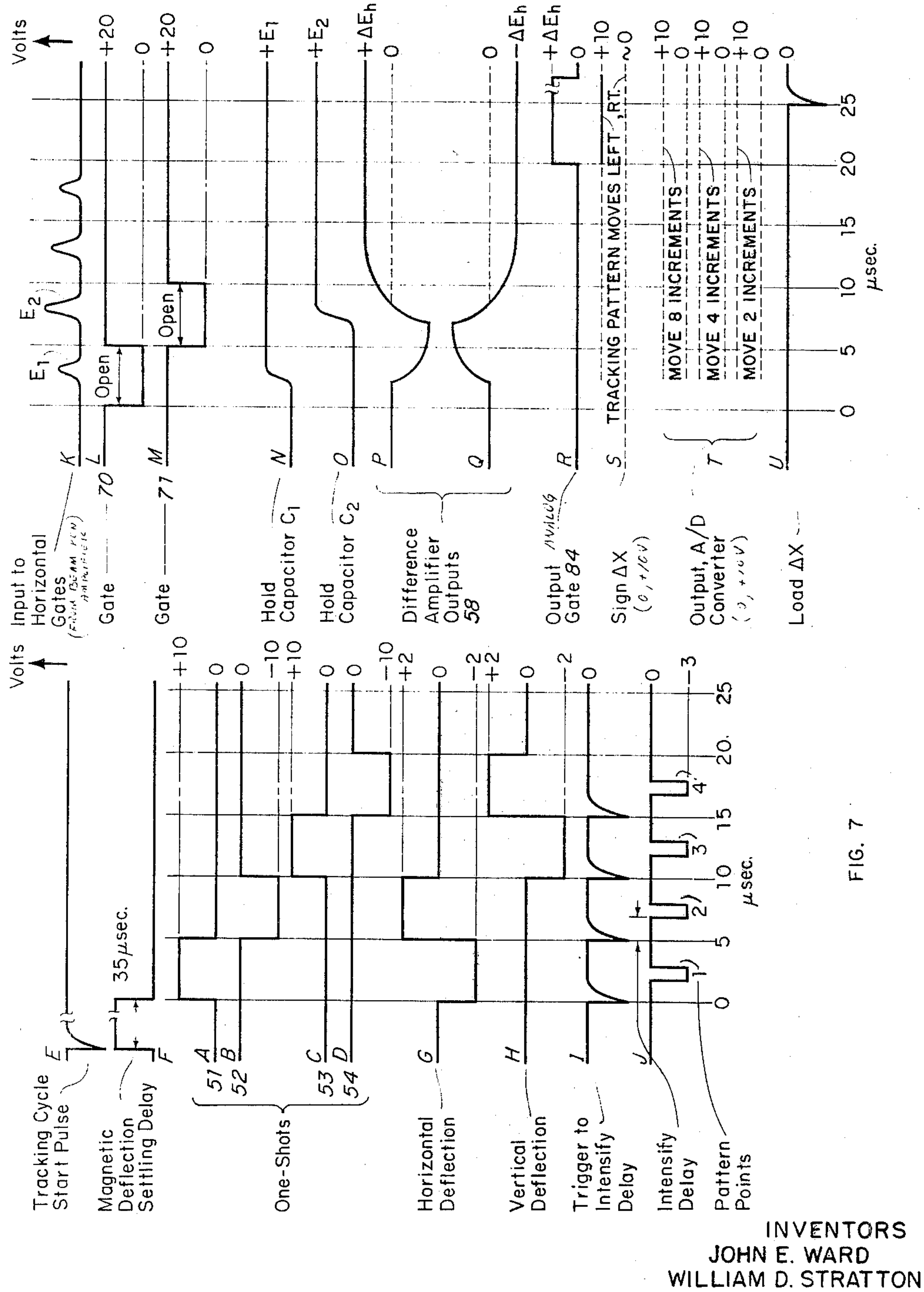
FIG. 7 is a timing diagram of the voltages at selected points of the diagrams of FIGS. 5 and 6.

Details of the system are shown in the block schematics of FIGS. 5 and 6. Circuit waveforms are shown in the timing diagram of FIG. 7. Once the main deflection system of the display has settled to the position specified by the X pen-position register 60 and the Y register (not shown) (35 μsec. for a system that was constructed), the horizontal error is available in digital form in 25 μsec., and the vertical error (not shown) in 35 μsec. Another 35 μsec. must then be allowed for the display to return to the X, Y positions as determined by the computer 61 it was at when interrupted by the tracking cycle. Thus, the total cycle time for tracking is 105 μsec., as compared with 1 msec. for the prior art digital method.

The main deflection system comprises the magnetic beam deflection circuitry 77 (for the horizontal deflection direction) together with its analog input voltage from D/A converter 78. The input to converter 78 will be either a horizontal digital position signal X from computer 61, when information is being presented on the face of CRT 56 from the computer storage; or the input to converter 78 will be X register 60, the last pen-position, when the system is in the pen track mode of operation. When in the pen track mode of operation gate 79 will be in the "on" position during the time interval represented by waveforms $F+A+B+C+D$. When not in the pen tracking mode gate 80 will be gated "on" by the complement of these waveforms so that the input X from computer 61 will be applied to D/A converter 78.

GENERATION OF THE TRACKING CROSS

At the beginning of each tracking cycle, the information in the pen-position registers 60 is used to magnetically deflect the blanked electron beam to the position of the pen as determined by the previous tracking cycle. The tracking cross is developed using electro static deflection G, H to further deflect the beam slightly about this position, first to the right, then left, up, and down. At each position, an unblanking pulse is applied and a point of the cross is formed.

The block diagram of the tracking pattern circuitry is shown in FIG. 5. The associated waveforms are shown in the timing diagram of FIGURE 7. Initially, the pulse E starting the tracking cycle is used to trigger delay unit 63 to provide a 35 microsecond delay F, necessary to provide settling time for the magnetic deflection mode 64. The trailing edge of this delay pulse F starts the generation of the cross. Four deflection voltages A, B, C and D symmetrical about zero volts, are generated by four monostable multivibrators (one-shot MV's 51, 52, 53, 54). These signals are combined, in pairs, in units 65, 66 to obtain the required horizontal G and vertical H deflection voltages, and are then amplified and coupled to electrostatic deflection plates of CRT 56. After each of the four sequential deflection plate voltages has achieved its steady state, unblanking pulses J are applied to intensity modulate the electron beam of CRT 56 and the corresponding point of the cross is illuminated. Pulses J are obtained from the leading edge of pulses A–D after shaping in combining unit 67 to provide pulses I which are then delayed in monostable MV 68 before triggering monostable MV 69.

To accomplish the above cross generation, the four deflection one-shots 51–54 are connected in cascade, the trailing edge of the output of each circuit serving to trigger the following unit.

The leading edge of each output pulse A–D is used to initiate a delay slightly greater than the rise-time of the deflection amplifier (not shown). At the end of this delay, the unblanking pulse J occurs. The above sequence of events is detailed graphically in the timing diagram of FIGURE 7.

In addition to generating the required deflection waveform A–D the four one-shots also provide four independent circuit states which are used to control the gating of the pen output signals. For the horizontal channel gates 70, 71 are open during states A and B as shown in waveforms Land M.

SAMPLING AND STORING OF PEN SIGNALS

The pen sensor 55 may be the conventional light pen such as previously described or may be a "beam pen" which relies on capacitive pickup to detect the electron beam itself, rather than the light it creates when it impinges on the face of the CRT 56. The "beam pen" is described in the AFIPS Proceedings—Fall Joint Computer Conference, 1965, in an article by D. H. Haring. The desirable feature of the beam pen is that its output is independent of phosphor decay time. An undesirable feature is that the beam pen field-of-view response curve is considerably broader than that of the light pen because the charge generated impingement of the beam can be detected over an area larger than that occupied by the illuminated spot. The difference in outputs $E_1$, $E_2$ for a given displacement of the pen axis from the centerline of spots 1, 2 is therefore less for the beam pen than for the light pen. The beam pen, in a stationary situation, produces a pulse-to-pulse output fluctuation equal to approximately ten percent of the D-C output amplitude.

With the beam pen 55 placed over the tracking cross, four output pulses K will occur during each track cycle, their amplitudes depending on the proximity of the pen to each of the cross dots 1, 2, 3 and 4. The first two pulses $E_1$, $E_2$ are used to determine the horizontal pen position error; the remaining two pulses, the vertical error. The horizontal and vertical channels of this pen-tracking system are identical in design and performance. After the pen output pulses $E_1$, $E_2$ corresponding to the horizontal arm of the cross have been processed, an identical procedure is followed with respect to the vertical arm. The only difference existing between the two channels is the final destination of the binary error signal generated by each circuit. The horizontal channel loads this information into the $\Delta X$ register 59; the vertical channel, into the $\Delta Y$ register (not shown). In view of this duplication, only one channel, the horizontal, is described in detail.

The circuitry required for the processing of the pen 55 responses $E_1$, $E_2$, to the horizontal arm, points 1, 2, of the tracking cross is shown in block form in FIGURE 6. The output of the beam pen amplifier 72 is coupled to an emitter follower 73 to provide the required current gain and source impedance for the sampling stages 70, 71. The output of the emitter follower 73 (the pen response corresponding to each point of the cross) is applied to the inputs of the two channels. The horizontal channel, with which we are concerned here, commences with two parallel analog gates 70, 71. During each tracking cycle, four pulses K are received from the beam pen. The first two $E_1$, $E_2$, are the responses to the horizontal arm of the cross, the initial pulse corresponding to the right dot 1; the second, to the left dot 2. While the first point 1 of the cross is being illuminated, and the corresponding beam pen pulse $E_1$ generated, the deflection multivibrator one-shot 51 is in its unstable state, producing a +10-volt, 5-microsecond wide pulse A. This pulse, in addition to providing the deflection for the first point of the tracking cross, is used as the control signal L at the first analog gate 70. Gate 70 is opened for this 5-microsecond duration and permits passage of the first pen output pulse $E_1$ to hold circuit 75. Potentiometer 74 is initially adjusted to ensure that the maximum amplitude of the pen pulses is less than the gate control signal L.

Diode $D_1$ and capacitor $C_1$ serve as a peak detector and hold circuit 75. When gate 70 turns off, $C_1$ is charged to the peak amplitude of the first pen output pulse $E_1$. During the remainder of the tracking cycle, $C_1$ remains essentially charged at its peak value. Performance of the second analog gate 71 is identical. One-shot 52 generates the control voltage N, and hold capacitor $C_2$ is charged to the peak value of the second pen output pulse $E_2$. (Similarly, the analog gates of a vertical channel would be controlled by one-shot MV's 53, 54.)

At this point in the analog tracking cycle, the two sampling capacitors $C_1$, $C_2$ hold the peak amplitudes N, O of the pen responses $E_1$, $E_2$ to the two horizontal points 1, 2 of the cross. The difference between these amplitudes N, O is the error voltage specifying the distance separating the center line of points 1, 2 and the axis of the pen 55, and is obtained with the difference amplifier 58. Each sampling capacitor $C_1$, $C_2$ is coupled to this amplifier through a Darlington-pair emitter follower 76. This configuration provides sufficient isolation of the holding capacitors $C_1$, $C_2$ to prevent excessive discharge before subtraction occurs.

Emitter followers 81, 82 couple the outputs of the difference amplifier 58 having waveforms P, Q respectively to diode OR gate 83. One output of amplifier 58 is also coupled to Schmitt trigger 91 which serves to load the horizontal sign bit of $\Delta X$ register 59. Diode gate 83 couples the positive-going output of difference amplifier 58 to analog gate 84. Gate 84 remains closed until the output transient of gate 83 has decayed to zero. At this time, gate 84 is opened by gate control one-shot MV 85 which is triggered by the trailing edge of waveform D. The output voltage waveform R of gate 84 is coupled to A/D converter 62 through filter circuit 86 comprising an envelope detector 87 and low pass filter 88. Filter circuit 86 reduces noise produced by small variations in beam-pulse amplitudes due to the electron-beam and the CRT phosphor. Also, since the small signal detected by the pen undergoes considerable amplification prior to insertion in the tracking circuitry, stray signals picked up in an early stage can contribute significantly to the output and must be filtered to reduce their influence.

The binary bits $b_0$, $b_1$, $b_2$, of digital output T of converter 62 are stored in the $\Delta X$ register 59 together with the binary sign bit S. The information is transferred through gate 89 to X register 60 after the X and Y tracking information has been obtained. The pulse U from load one-shot MV 90 turns on gate 89 for a time sufficient to shift the X information into the X register 60 (only a few microseconds). The shift pulse U occurs about 5 microseconds after input signal gating waveforms A–D have terminated.

Although specific embodiments of the present invention have been depicted, it is obvious that numerous additions and substitutions may be made without departing from the spirit and scope of the invention. Accordingly, the invention should be deemed limited only insofar as it is restrictively defined in the following claims.

What is claimed is:

1. Pen tracking apparatus of the type comprising a cathode ray tube,
   - means for intensity modulating a beam of electrons within said tube,
   - a pen responsive to the effect produced by the electron beam impact on the face of said tube,
   - said pen having an axis,
   - said pen having an output which diminishes with the distance between said axis and said beam impact position,
   - means for deflecting said beam in response to a stored signal and a second signal,
   - means for providing said stored signal to said deflecting means to cause said beam to deflect to the position of the pen axis determined during the previous tracking cycle,
   - means for providing a sequence of pulsed second signals at the time said stored signal is applied to deflect the beam incrementally about its stored pen axis position,
   - means for providing intensifying pulses to said intensity modulating means in time coincidence with said pulsed second signals to provide a plurality of beam impingements on said face spaced in time and space from each other,
   - said pen being responsive to said beam impingements to provide a plurality of output signal pulses in sequence,
wherein the improvement comprises,
means for determining the difference in amplitude and sign of said output pulses to obtain an error signal proportional to the position of the axis of said pen with respect to the non-incrementally deflected beam position,
means for adding said error signal to said stored signal to provide a new stored signal corresponding to the actual location of said pen axis to complete the tracking cycle.

2. The apparatus as in claim 1 wherein
said sequence of pulsed second signals deflects said beam in orthogonal directions to provide two points of beam impingement on said face along each direction,
said pen being responsive to said beam impingements to provide output signals,
means for determining the difference in amplitude and sign of said output signals from impingement points along one direction to provide a first error signal,
said stored signal comprising first and second component signals each to deflect said beam along one of said orthogonal directions,
said first component signal deflecting said beam along the same direction as said first error signal,
means for adding said first error signal to said first component signal to provide a signal corresponding to the pen axis position in said one direction,
means for determining the difference in amplitude and sign of said output signals from impingement points along the remaining orthogonal direction to provide a second error signal,
means for adding said second error signal to said second component signal to provide a signal corresponding to the pen axis position in said orthogonal direction.

3. Apparatus as in claim 1 wherein
said deflection means comprises means for deflecting said beam in a first direction and a second means for deflecting said beam in a second direction,
said pulsed signals comprising a first and second pulsed signal,
means for applying a first signal to said first deflection means,
means for applying a second signal to said second deflection means,
said first signal providing a pair of points of impingement of said beam on the face of said tube in said first direction,
said second signal providing a pair of points of impingement of said beam on the face of said tube in said second direction,
wherein the improvement comprises,
means for detecting the amplitudes of the pen responses to said first direction beam impingements,
means for determining the difference in amplitude and sign of said first direction pen response amplitudes,
means for providing said amplitude and sign of said first direction amplitude difference to said first deflection means to deflect said beam along said first direction toward the axis of said pen,
means for detecting the amplitudes of the pen responses to said second direction beam impingements,
means for determining the difference in amplitude and sign of said second direction pen response amplitudes,
means for providing said amplitude and sign of said second direction amplitude difference to said second deflection means to deflect said beam along said second direction toward the axis of said pen.

4. Apparatus as in claim 3 wherein
said first and second directions are orthogonal.

5. The apparatus of claim 1 wherein
said pulsed second signals deflect said beam about its stored pen axis position to form a pattern of four impact points each equally spaced from said stored pen axis position and from each other,
two of said points lying along a first line,
the other two points lying along a second line orthogonal to said first line,
means for comparing the amplitude of said pen outputs produced by said points along said first line to provide a first error signal,
means for determining the amplitude of the component of said stored signal which produces the deflection of said beam along said first line,
means for adding said first error signal to said first line component,
means for comparing the amplitude of said pen outputs produced by said points along said second line to provide a second error signal,
means for determining the amplitude of the component of said stored signal which produces the deflection of said beam along said second line,
means for adding said second error signal to said second line component.

6. The apparatus of claim 1 wherein
said cathode ray tube has a phosphorus coating on its face,
said electron beam impingement on said phosphor coated face producing light output,
said pen being responsive to said light output to provide an electrical output signal diminishing with distance from the point of light output to the axis of said pen.

7. The apparatus of claim 1 wherein
said electron beam impingement on said cathode ray tube face produces an electrical charge at the point of impact,
said pen having an input responsive to said charge to provide an electrical output signal diminishing with distance from the point of impact to the axis of said pen.

References Cited

UNITED STATES PATENTS

| | | | |
|---|---|---|---|
| 3,028,500 | 4/1962 | Wallmark | 250—211 |
| 3,089,918 | 5/1963 | Graham | 178—19 |
| 3,271,515 | 9/1966 | Harper. | |
| 3,337,860 | 8/1967 | O'Hara | 315—18 X |
| 3,394,366 | 7/1968 | Dye | 340—324.1 |

RODNEY D. BENNETT, Primary Examiner
B. L. RIBANDO, Assistant Examiner

U.S Cl. X.R.

340—324